(12) United States Patent
Nakayama et al.

(10) Patent No.: US 7,036,737 B2
(45) Date of Patent: May 2, 2006

(54) IMAGE FORMING APPARATUS

(75) Inventors: Toshiki Nakayama, Shizuoka (JP);
Tomoaki Nakai, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 10/247,309

(22) Filed: Sep. 20, 2002

(65) Prior Publication Data

US 2003/0058251 A1    Mar. 27, 2003

(30) Foreign Application Priority Data

Sep. 26, 2001 (JP) ............................. 2001-293631

(51) Int. Cl.
  *G02B 26/10* (2006.01)
(52) U.S. Cl. .................. 235/462.25; 235/454; 399/49
(58) Field of Classification Search .......... 235/462.25, 235/436, 454, 479; 399/27, 39, 45
See application file for complete search history.

(56) References Cited

U.S. PATENT DOCUMENTS

| | | | |
|---|---|---|---|
| 5,325,153 A | | 6/1994 | Mitsuse et al. |
| 5,600,574 A | | 2/1997 | Reitan |
| 5,804,805 A | * | 9/1998 | Koenck et al. ........ 235/462.01 |
| 5,963,756 A | | 10/1999 | Sakai et al. |
| 6,029,023 A | * | 2/2000 | Munemori et al. ........... 399/66 |
| 6,185,386 B1 | | 2/2001 | Noguchi |
| 6,263,173 B1 | * | 7/2001 | Nakamura et al. ............ 399/82 |
| 6,505,010 B1 | | 1/2003 | Izumizaki et al. |
| 6,853,815 B1 | * | 2/2005 | Tezuka et al. ................ 399/39 |
| 6,898,381 B1 | * | 5/2005 | Maebashi et al. ............ 399/15 |

FOREIGN PATENT DOCUMENTS

| | | | |
|---|---|---|---|
| EP | 1 103 799 | | 5/2001 |
| JP | 403092876 A | * | 4/1991 |
| JP | 8-36329 | | 2/1996 |

\* cited by examiner

*Primary Examiner*—Daniel Stcyr
(74) *Attorney, Agent, or Firm*—Fitzpatrick, Cella, Harper & Scinto

(57) ABSTRACT

An image forming apparatus has an image forming unit for forming an image on a recording medium; a conveying unit having a conveying part for conveying the recording medium while contacting the recording medium; a detection unit for detecting the chromaticity or the density of the image formed on the recording medium; and a control unit for controlling the image forming unit based on the chromaticity or the density of the image detected by the detection unit. The image forming unit forms an image for which the chromaticity or the density is to be detected at a predetermined position on the recording medium whereat the recording medium does not contact the conveying parts of the conveying unit. With this configuration, an image having a stable quality can be formed.

21 Claims, 10 Drawing Sheets

IMAGE FORMING APPARATUS

BACKGROUND OF THE INVENTION

1. Field of the Invention

The present invention relates to an electrophotographic image forming apparatus or an ink-jet image forming apparatus, and relates in particular to an image forming apparatus that can form an image having a stable quality.

2. Related Background Art

As one problem that is encountered when an electrophotographic image forming apparatus is employed, the quality (density, chromaticity, etc.) of an image formed on a recording medium will vary because of a change in the environment in which the apparatus is employed or because when an apparatus has been in use for an extended period of time, the operation of its individual sections may fluctuate. Especially when an image forming apparatus that forms a color image on a recording medium is employed, since the color balance of an image formed on a recording medium can be destroyed even by a slight change in the environment, or by fluctuations in the operation of the individual sections of the apparatus, it is of course preferable that a constant image quality be maintained, even when the environment is or the operation of the individual sections of the apparatus fluctuate.

Therefore, for an electrophotographic image forming apparatus, correction means are provided for selectively changing several image forming conditions that are related to the amount of exposure, and a developing bias in accordance with the environmental state, such as the absolute humidity, or gradation correction means, such as a lookup table (LUT), for correcting image data in order to form an image having a desired density. When these means are employed, based on the environmental state, such as the absolute humidity read by a humidity sensor, the image forming apparatus can select an image forming condition or an optimal value for gradation correction.

Further, in order to obtain a constant image quality, even when the individual sections of an color image forming apparatus are changed, a method is employed whereby color toners are used to form a density detection toner patch on an image bearing member, such as an intermediate transfer member or a photosensitive drum, and the density of the unfixed toner patch is detected by an unfixed toner density sensor.

According to this method, the results obtained by the unfixed toner density sensor are fed back for an image forming condition, such as the amount of exposure or the developing bias, and the density is controlled. In this manner, an image can be formed for which the quality is stabilized.

However, although the density of a toner image can be controlled for the density control process, during which the unfixed toner density detection sensor is used to detect the density of an unfixed toner patch that is formed on an image bearing member, changes in the color balance can not be controlled for the image transfer process, during which an image is transferred from the image bearing member to the recording medium and is thereafter fixed to the recording medium. The color balance of a toner image is changed by the relative efficiency of the procedure used to transfer the image, and by the heat and the pressure applied to fix the image to the recording medium. Thus, changes in the color balance of an image can not be appropriately controlled by the density control process for which the unfixed toner density sensor is used.

Therefore, an image forming apparatus has been proposed wherein a sensor (hereinafter referred to as a color sensor) is provided to detect the density of a monochromatic toner image or a full-color image that has been transferred and fixed to a recording medium. According to this image forming apparatus, a color toner patch (hereinafter referred to as a patch) for controlling density or chromaticity is formed on the recording medium, the density or the chromaticity detected by the color sensor is fed back for an image forming condition, such as the amount of exposure, a developing bias or a lookup table (LUT), and the density or the chromaticity of the image that is finally output on the recording medium.

The color sensor employs red (R), green (G) and blue (B) light sources as light emitting elements for detecting density or chromaticity, and employs one light receiving element for detecting the reflected components of the light emitted by the light emitting elements. After light beams have been emitted by the R, G and B light emitting elements, the light receiving element detects the reflected components as R output, G output and B output signals. Then, by using the R output, G output and R output, the CMYK color model can be identified and color densities of the CMYK can be detected. In addition, linear conversion can be employed to mathematically process the R output, G output and B output, or lookup table (LUT) conversion can be used to detect the chromaticity.

Besides the above configuration, the light emitting element and the light receiving element can also be so designed that light reflected by the patch is split using a prism, and that signals corresponding to the individual wavelength components are obtained by a line sensor.

An ink-jet image forming apparatus has the same image quality (density-gradation characteristic, etc.) fluctuation problem as has the electrophotographic image forming apparatus, since the color balance of an image may be altered due to time-transient variations in the amount of ink that is ejected, a change in the environment or manufacturing variances in the production of detachable ink cartridges. Therefore, a method has been proposed whereby a color sensor is provided for detecting the surface of a recording medium on which an ink image is formed, and whereby the density or the chromaticity of a patch on the recording medium, which is detected by the color sensor, is employed to control the image forming apparatus and to ensure that an image having a stable quality is formed.

In the above described image forming apparatus, by using a color matching table, RGB data for an image to be output are converted into device RGB signals that are handled by each image forming apparatus, and by using a color separation table, the device RGB signals are converted into YMCK signals that match toner and ink colors. Then, by using a calibration table, the YMCK signals are converted into Y'M'C'K' signals obtained by correcting the density-gradation characteristic inherent to each image forming apparatus. As a result, therefore, several methods for controlling the density or the chromaticity can be employed.

For example, the calibration table may be corrected using the measured density or the color matching table or the color separation table may be corrected using the measured chromaticity, which provides for the formation of an image having the desired color reproducibility.

However, for a conventional image forming apparatus that detects the chromaticity and the density of the patch formed on a recording medium in order to obtain an image for which the quality is stable, conveying parts, such as a roller, a rolling member and a rib, are present along a conveying path, leading to the color sensor, originating at the image forming unit for forming an image on a recording medium. Thus, the following problems have arisen.

Since micro stripes and roughness of the paper fiber occur when a conveying part rubs against the surface of a toner patch, the colors of the toner patch are mixed or their brightness is changed, and the spectral reflectance factor of light reflected by the toner patch can not be correctly measured by the color sensor.

Since it is especially preferable for the electrophotographic image forming apparatus that, in order to avoid the adverse influence of heat of a fixing device, the color sensor be located at a distance from the fixing device and within a range wherein the switch batch function of a double-sided printing unit can be effectively utilized, the portion of the conveying path following the transferring and fixing process must be extended, and the occurrence of adverse affects attributable to such conveying parts as a roller, a rolling member and a rib is increased.

Further, in an electrophotographic image forming apparatus, unfixed toner, i.e., toner remaining after an image has been fixed by the fixing device, is charged by friction produced between a recording medium and a conveying part and adheres to the conveying part, and a toner stain may occur on the surface of a recording medium that contacts the conveying part.

SUMMARY OF THE INVENTION

To resolve the above conventional shortcomings, it is one objective of the present invention to provide an image forming apparatus that can form an image having a stable quality.

It is another objective of the present invention to provide an image forming apparatus that can precisely detect the chromaticity and the density of a toner patch that has been fixed to a recording medium, and that feeds back the detection results for an operating condition for the image forming apparatus so that color reproducibility can be preferably controlled.

To achieve these objectives, according to the present invention, an image forming apparatus comprises:

image forming means for forming an image on a recording medium;

conveying means having a conveying part for conveying the recording medium on which the image is formed by the image forming means, while contacting the recording medium;

detection means for detecting the chromaticity or the density of the image formed on the recording medium by the image forming means; and control means for controlling the image forming apparatus based on the chromaticity and the density of the image detected by the detection means, wherein the image forming means forms, at a predetermined position on the recording medium that the conveying part of the conveying means does not contact, a detection target image that the detection means detects a chromaticity or a density thereof.

Further, to achieve the objectives, according to the present invention, an image forming apparatus comprises:

image forming means for forming an image on a recording medium;

conveying means, having a conveying part for conveying the recording medium on which the image is formed by the image forming means while contacting the recording medium;

detection means for detecting the chromaticity or the density of the image formed on the recording medium by the image forming means; and control means for controlling the image forming apparatus based on the chromaticity or the density of the image detected by the detection means, wherein the conveying part of the conveying means is located at a predetermined position, in a direction substantially perpendicular to the direction in which the recording medium is conveyed, whereat the conveying part does not contact the target detection image formed by the image forming means.

Other objectives, configurations and effects of the present invention will become obvious in the following detailed explanation, while referring to the drawings.

DETAILED DESCRIPTION OF THE PREFERRED EMBODIMENTS (First Embodiment)

Figure 3:
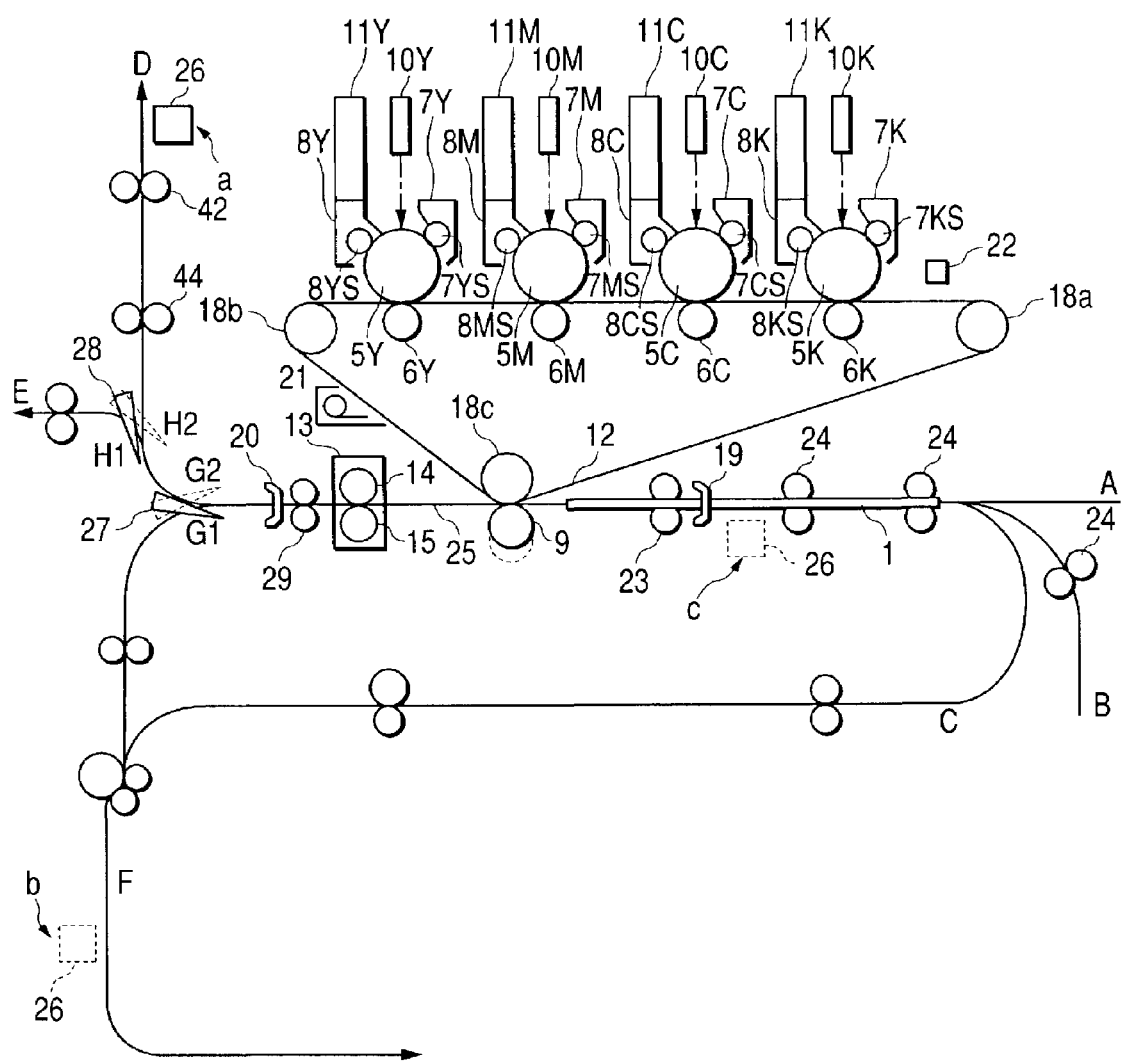
FIG. 3 is a diagram showing the configuration of the color image forming apparatus according to the first embodiment.

FIG. 3 is a diagram showing an image forming apparatus using an electrophotographic system according to a first embodiment of the present invention.

In FIG. 3, as a part of the color image forming apparatus, an image forming unit is shown that includes: photosensitive drums 5Y, 5M, 5C and 5K for an arrangement for which the number of stations corresponds to that of the development colors; charging means 7Y, 7M, 7C and 7K that serve as primary charging means; developing means 8Y, 8M, 8C and 8K; toner cartridges 11Y, 11M, 11C and 11K; an intermediate transfer member; a material feeding part; a transfer part; and a fixing part 13.

An overview of the operation of the image forming unit follows.

First, the image forming unit forms electrostatic latent images on the photosensitive drums 5, by exposing them to light based on color image signals, and develops these electrostatic latent images to form toner images. Then, it sequentially transfers the toner images from the photosensitive drums 5Y, 5M, 5C and 5K for the individual colors to the intermediate transfer member 12 to obtain a color toner image.

Thereafter, the color toner image is transferred from the intermediate transfer member 12 to a recording medium 1, and is fixed to the recording medium 1 by the fixing part 13.

Now that an overview of the operation of the image forming unit has been given, the individual sections of the image forming unit will be described in detail.

The photosensitive drums 5Y, 5M, 5C and 5K, which are formed by applying organic photoconductive layers to the outer surfaces of aluminum cylinders, are rotated by a driving force supplied by a drive motor 103. In accordance with the requirements of the image forming operation, the drive motor 103 rotates the photosensitive drums 5Y, 5M, 5C and 5K counterclockwise.

Light for exposing the photosensitive drums 5Y, 5M, 5C and 5K is transmitted by scanners 10Y, 10M, 10C and 10K, and, based on image data, is used to selectively expose and sequentially form electrostatic latent images on the surfaces of the photosensitive drums 5Y, 5M, 5C and 5K.

As the primary charging means, four charging devices 7Y, 7M, 7C and 7K, which are equipped with sleeves 7YS, 7MS, 7CS and 7KS, are provided for individual stations and are used for the yellow (Y), magenta (M), cyan (C) and black (K) charging of the photosensitive drums 5Y, 5M, 5C and 5K.

As developing means, four developing devices 8Y, 8M, 8C and 8K, which are equipped with sleeves 8YS, 8MS, 8CS and 8KS, are provided for developing and for visualizing the yellow (Y), magenta (M), cyan (C) and black (K) electrostatic latent images at the individual stations. The developing devices 8Y, 8M, 8C and 8K are detachably mounted on the main body of the apparatus.

The intermediate transfer member 12 is an endless belt, extending around a drive roller 18a and follower rollers 18b and 18c, that contacts the photosensitive drums 5Y, 5M, 5C and 5K. During the color image forming process, the intermediate transfer member 12 is rotated clockwise, and the individually colored images on the photosensitive drums 5Y, 5M, 5C and 5K are sequentially transferred thereto by primary transfer rollers 6Y, 6M, 6C and 6K.

As the initial paths along which a recording medium 1 is conveyed, a route A, leading from a paper feed tray (not shown), a route B, leading from a paper cassette (not shown), and a route C, leading from a double-sided printing unit, are provided, whereafter the recording medium 1 is conveyed along a conveying path formed by conveying rollers 24 to registration rollers 23 and is halted. It should be noted that whether the leading end of the recording medium 1 has reached the registration rollers 23 is determined by ascertaining whether the leading edge of the recording medium 1 has been detected by a registration sensor 19.

During the image forming process, at the timing whereat the color toner image on the intermediate transfer member 12 reaches a transfer area, which is a nip portion between a secondary transfer roller 9 and a follower roller 18c, the conveying is resumed of the recording medium 1 halted by the registration roller 23. Then, when the recording medium 1 has been fed from the registration roller 23 to the transfer area, whereat it is sandwiched between and conveyed by the intermediate transfer member 12 and the secondary transfer roller 9, and while the secondary transfer roller 9 is pressed against the intermediate transfer member 12, the color toner image is transferred from the intermediate transfer member 12 to the recording medium 1.

During a period wherein the color toner image obtained by superimposing Y, M, C and K colored toner images is transferred from the intermediate transfer member 12 to the recording medium 1, the secondary transfer roller 9 contacts the intermediate transfer member 12, as indicated by the solid line. After the printing has been completed, the secondary transfer roller 9 is separated from the intermediate transfer member 12 and is retracted to the position indicated by a broken line.

The fixing part 13 is used to fix the color toner image on the recording medium 1 while conveying the recording medium 1. As is shown in FIG. 3, the fixing part 13 includes a fixing roller 14 for heating the recording medium 1, and a pressure roller 15 for pressing the recording medium 1 against the fixing roller 14. The interiors of the fixing roller 14 and the pressure roller 15 are hollow, and heaters (not shown) are provided therein. The recording medium 1 which bears the color toner image is conveyed by the fixing roller 14 and the pressure roller 15, and the color toner image is fixed to the surface of the recording medium 1 by the application of heat and pressure.

In the color image forming apparatus, the recording medium 1, to which the color toner image has been fixed, is discharged by a discharge roller 29 to a discharge path (route D or route E) or to a double-sided conveying path (route F and route C) along which the recording medium 1, on one side of which an image has been formed, is inverted so as to form an image on the reverse side. The image forming operation is thereafter terminated. It should be noted that the recording medium 1 discharged from the fixing part 13 is detected by a fixing and discharging sensor 20.

Cleaning means 21 is used to collect waste toner remaining on the intermediate transfer member 12 after the four differently colored toner images have been transferred from the intermediate transfer member 12 to the recording medium 1.

Misregistration detecting means 22 detects a misregistration detection pattern formed on the intermediate transfer member 12 for identifying, among the YMCK colors, misregistration values in the main scanning direction and the sub-scanning direction, and performs a detailed image data adjustment to reduce misregistration.

A detecting part 26 detects a toner patch that is formed on the recording medium 1 to determine the chromaticity and the density. In order to avoid the effect produced by heat generated by the fixing part 13, it is preferable that the detecting part 26 be located at one of separate positions a to c in FIG. 3. The separate position a is along the discharge path (route D) for the discharge, outside the apparatus, of the recording medium 1; the separate position b is along the double-sided conveying path (route F) for inverting the recording medium, on one side of which an image has been formed, in order to form an image on the reverse side; and the separate position c is along the double-sided conveying path, immediately before the recording medium 1, on one side of which an image has been formed, is transported to the second transferring roller 9 for the formation of an image on the reverse side.

An explanation will be given for a case wherein the detecting part 26 is installed at the separate position a. When the color toner image is detected on the recording medium 1, a double-sided flapper 27, located at a position G1, forms a path that prevents the recording medium 1 from being conveyed to the double-sided printing unit, and an FU/FD flapper 28, located at position Hi, guides the recording medium 1 toward the face-down discharge unit (route D). At this time, a detecting part 26a, provided downstream, in the conveying direction, of rolling members 44 and rollers 42, detects light reflected by a toner patch 41 that has been fixed to the recording medium 1 by the fixing part 13.

In this embodiment, a roller part 42a, rolling parts 44a and ribs 43 are arranged along the conveying path along which the recording medium 1 passes through the image forming unit and at positions whereat they do not contact the recording medium 1, while the detecting part 26 is located at a position consonant with the toner patch 41. Even when the detecting part 26 is located at another position, including the separate position b or c, the same effects can be obtained because only the path leading from the paper feed port to the detecting part 26 is changed.

The individual sections of the color image forming apparatus in FIG. 3 have been explained. An explanation will now be given, while referring to FIGS. 1 and 2, for the positional relationships of the recording medium 1, the toner patch 41 used for detecting chromaticity or density, a conveying part such as the roller 42, and the detecting part 26 for detecting the chromaticity or the density.

Figure 1:
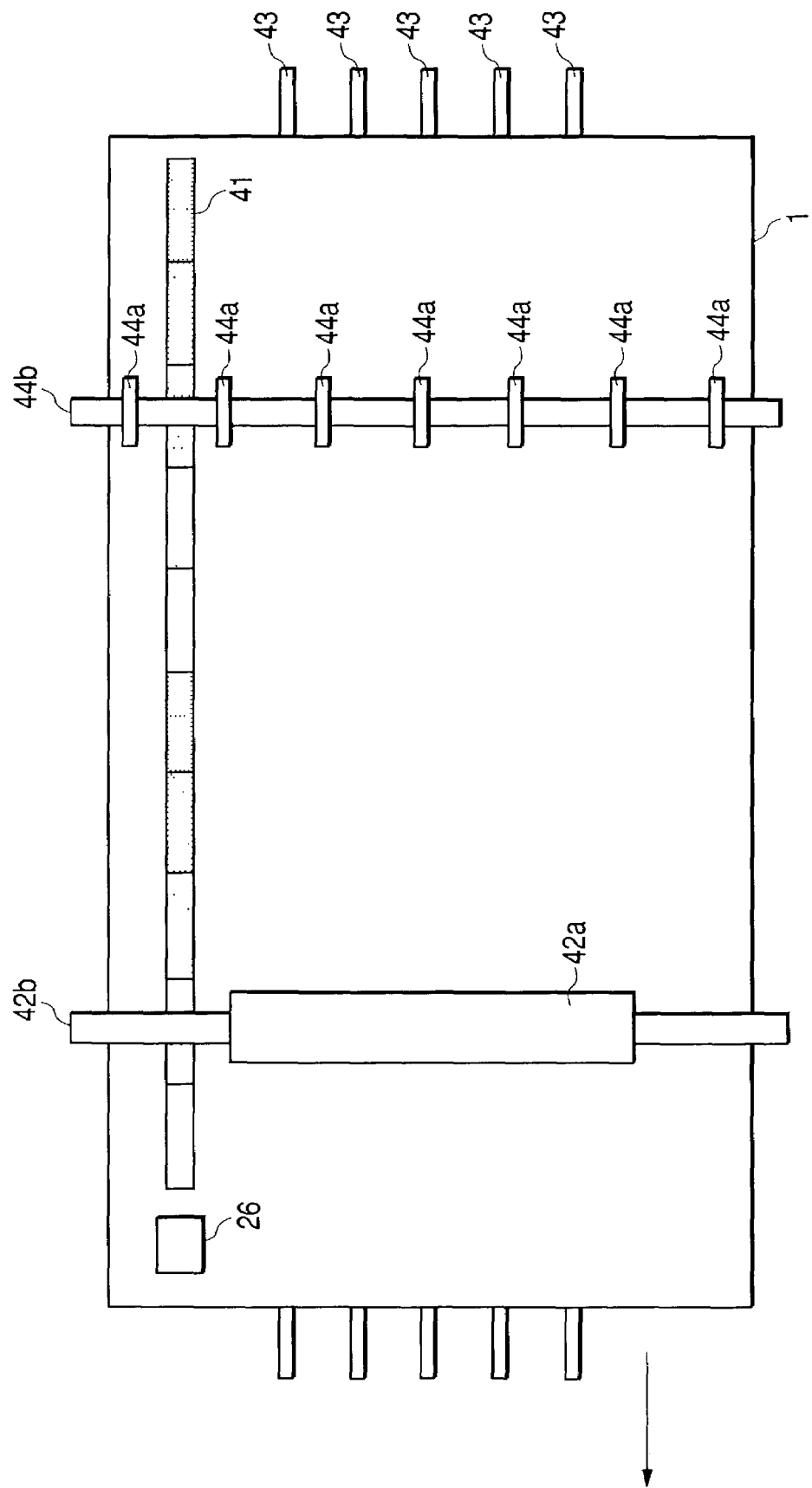
FIG. 1 is a plan view showing the positional relationship of a toner patch, a detecting part, a roller, a rib and a rolling member in a color image forming apparatus according to a first embodiment of the present invention.
Figure 2:
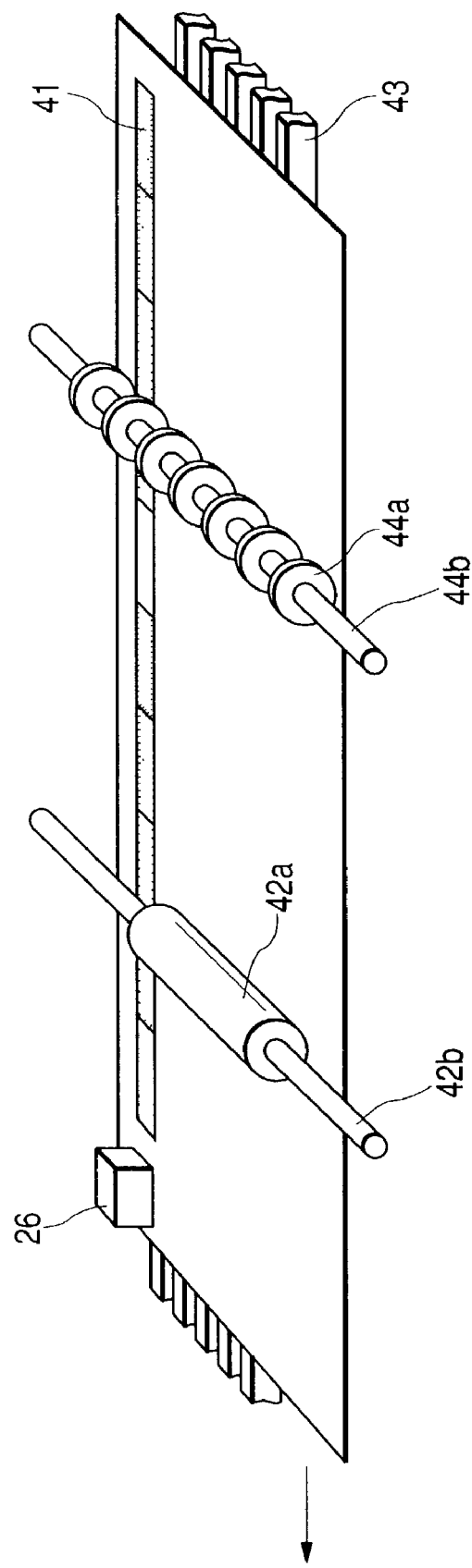
FIG. 2 is a perspective view showing the positional relationship of the toner patch, the detecting part, the roller, the rib and the rolling member in the color image forming apparatus according to the first embodiment.

FIG. 1 is a plan view showing the positional relationships of the recording medium 1 on which a toner patch is formed that is used by the image forming apparatus, the detecting part 26 for detecting the chromaticity and the density of the toner patch 41, the roller 42, the rolling member 44 and the ribs 43 that are arranged along the conveying path for the recording medium 1. FIG. 2 is a perspective view for illustrating the positional relationships.

In FIG. 1, the detecting part 26 detects chromaticity or density, the toner patch 41 is provided for the detection of the chromaticity or the density, and the recording medium 1 bears the toner patch 41 on its surface.

The roller 42 is used to convey the recording medium 1. As the roller part 42a, which contacts the recording medium 1, is rotated, the recording medium 1 is conveyed in the direction of the rotation. To rotate the roller part 42a, a driving force produced by the drive motor 103, which will be described later, is applied to and rotates a roller shaft 42b, and the rotational force is transmitted to the roller part 42a.

The rolling member 44 includes rolling parts 44a that are rotated in consonance with the recording medium 1, and a rolling shaft 44b, which is the rotational shaft on which the rolling parts 44a are mounted. The ribs 43 guide the recording medium 1.

The rolling parts 44a are arranged at multiple locations at predetermined intervals in the direction perpendicular to the direction in which the recording medium 1 is conveyed, which is indicated by an arrow in FIG. 1. Further, in FIG. 1 the rolling parts 44a are positioned at seven locations along the rolling shaft 44b, and to convey the recording medium 1, the drive motor 103 transmits a driving force to the roller shaft 42b, as is described above, and also to the photosensitive drum 5.

As is indicated by the arrow, the recording medium 1 is conveyed from the right to the left by the roller part 42a, while the toner patch 41 passes under the detecting part 26. At this time, the detecting part 26 can obtain chromaticity and density information for the toner patch 41 that is fixed to the recording medium 1. In this embodiment, the toner patch 41 is formed on the surface of the recording medium 1 at a position other than those that are contacted by the conveying parts, such as the roller part 42a, the rolling parts 44a and the ribs 43, and especially at a position other than the center of the conveying path for the recording medium 1 whereat the roller part 42a, the rolling parts 44a and the ribs 43 will probably be arranged (e.g., a position near the edge of the recording medium 1 in the direction perpendicular to the conveying direction). The detecting part 26 is then located so that its position corresponds to that whereat the toner patch 41 is formed. Further, as is shown in FIG. 1, it is preferable that the toner patch 41 be formed only at a position other than one that is contacted by a conveying part, and not at other locations.

Therefore, the toner patch 41 is not affected by fabric roughness or micro strips that are generated when a conveying part rubs against the surface of the toner patch 41, and is not stained by a conveying part, such as the roller part 42a, the rolling parts 44a or the ribs 43, to which unfixed toner may be attached.

According to this configuration, the chromaticity or the density of the toner patch 41 can be detected, and precise detection results can be fed back for the operating condition or the image processing condition of the image forming unit. Thus, an image forming apparatus can be provided for which the color reproducibility is satisfactory.

An example arrangement for the detecting part 26 will now be described in detail while referring to FIGS. 4 and 5.

Figure 4:
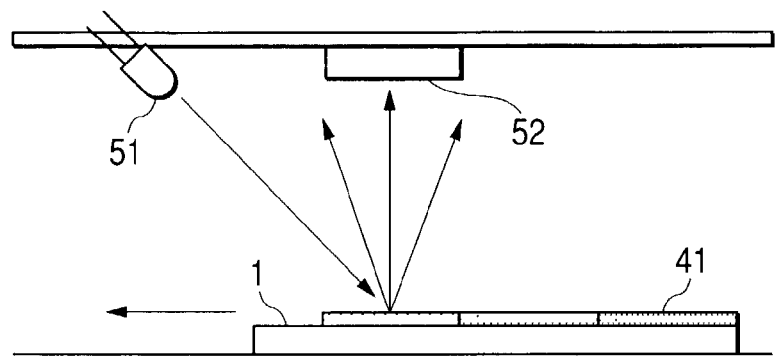
FIG. 4 is a diagram showing the configuration of the detecting part in FIG. 1.
Figure 5:
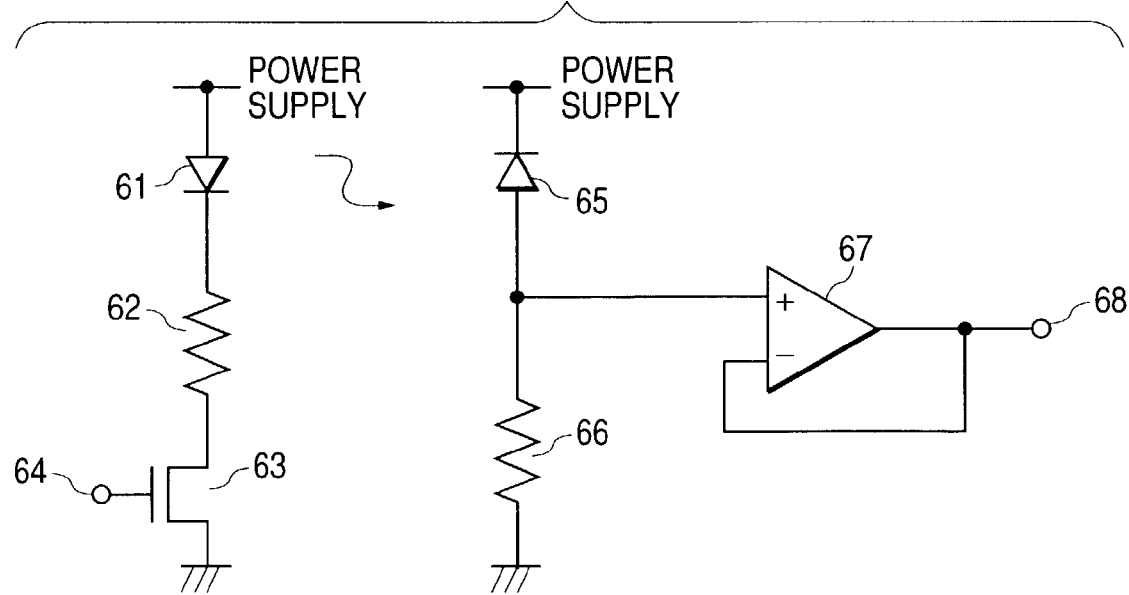
FIG. 5 is a diagram showing the circuit structure of the detecting part in FIG. 3.

FIG. 4 is a diagram showing the arrangement of the detecting part 26 used to detect the chromaticity and the density of the toner patch 41, while FIG. 5 is a diagram in which the circuit structure of the detecting part 26 is shown.

In FIG. 4, to detect the chromaticity or the density, light emitted by a light emitting part 51, at an angle of about 45°, strikes the toner patch 41 that is formed on the recording medium 1 and is irregularly reflected upward and scattered by the toner surface. A light receiving part 52 is provided to detect the irregularly reflected element of the reflected light.

As is shown in FIG. 5, the light emitting part 51 includes an LED 61, a current limit resistor 62 and an NMOSFET 63 that functions as a switch and is used for changing the ON/OFF state of the LED 61. When a control signal 64 is low, the NMOSFET 63 is turned off, no current flows across the LED 61, and the light source is off. When the control signal 64 is high, the NMOSFET 63 is turned on, the current from the power source is supplied to the LED 61, and the light source is turned on. Therefore, the ON/OFF state of the light source can be selected by changing the high and low level of the control signal 64. To examine the chromaticity of the toner patch 41, a light source, such as a white LED, having a spectrum for the whole visible light range is used. To detect only the density of the toner, an infrared LED is satisfactory, and a white LED is not required.

As is shown in FIG. 5, the light receiving part 52 includes: a photodiode 65; a resistor 66 for performing current-voltage conversion for a photocurrent; and an operating amplifier 67 having a voltage follower structure for buffering the voltage obtained by the current-voltage conversion. To detect the chromaticity of the toner patch 41, three of the light receiving parts 52 are provided and light enters the photodiodes through R, G and B filters (not shown), and three outputs are converted by an A/D converter (not shown) and the obtained values are employed for calculations. To detect the density, only one light receiving part 52 need be employed and no color filter is required.

In this embodiment, three photodiodes mounting three RGB filters have been employed to detect the chromaticity of the color toner image. However, the sensor need not always be a photodiode, and a photoresistor or an accumulation type sensor, such as a CCD or an MOS sensor, may be employed. Further, a wavelength that is transmitted through a filter is not limited to RGB. And of course, the same effects can also be obtained when the light reflected from the toner patch is measured by using a line sensor wherein multiple sensors that correspond to a spectrophotometry system are provided to receive light beams after the light has been split using a prism, or by using a single sensor while the ON/OFF state of the light sources, such as R, G and B LEDs, having different emitted light wavelengths is changed in a time-sharing manner.

While referring to FIG. 11 for the control block diagram of a color image forming apparatus, an overview will now be given for an operation wherein the results obtained by the detecting part 26 are fed back for the engine operating condition and the image processing condition in order to correct the chromaticity and the density.

Figure 11:
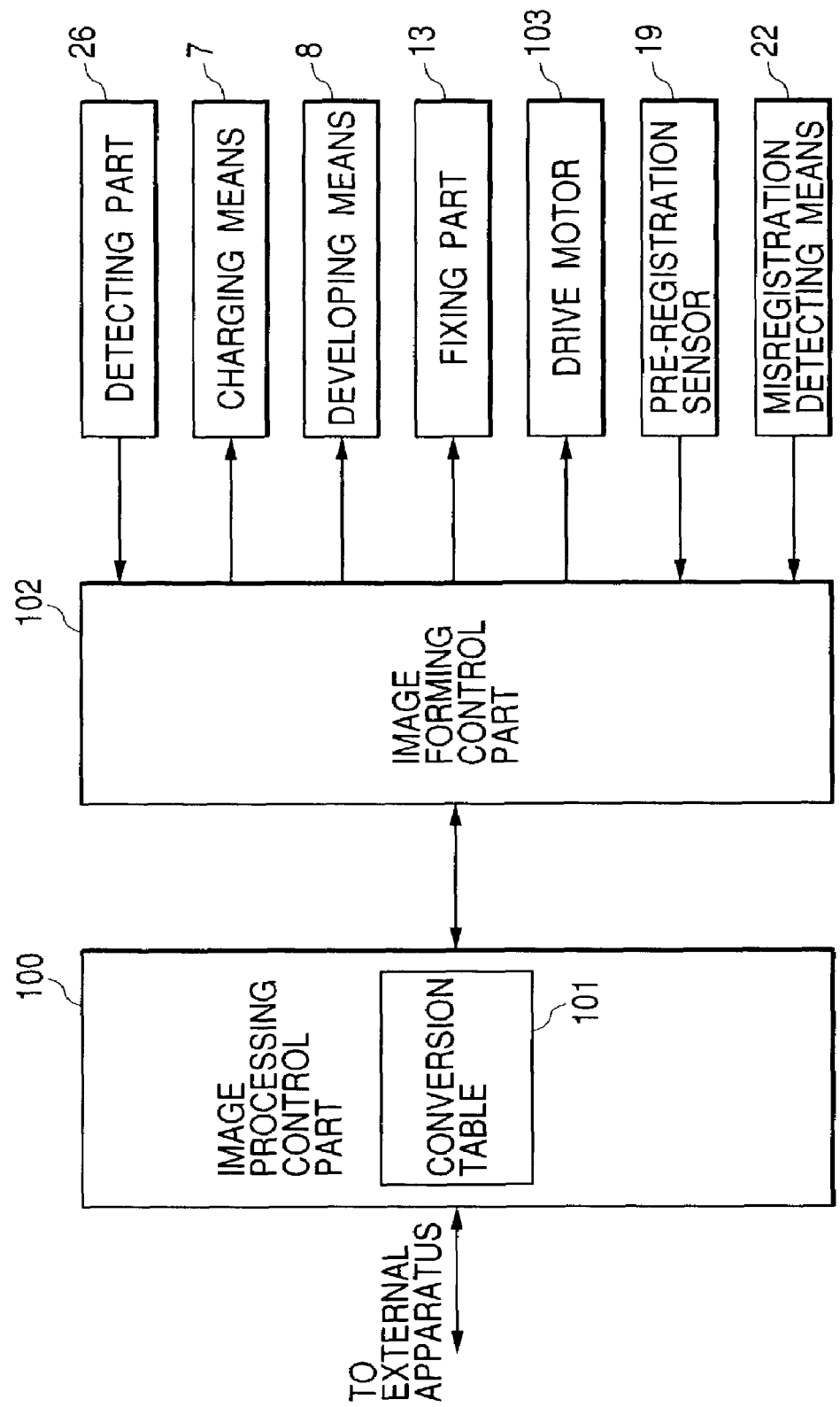
FIG. 11 is a control block diagram showing the color image forming apparatus.

In FIG. 11, an image processing control unit 100 is used to process an RGB signal received from an external apparatus, such as a host computer. The image processing control unit 100 employs a color matching table included in a conversion table 101 to convert an input RGB signal into a device RGB signal that can be handled by each image forming apparatus, and then employs a color separation table included in the conversion table 101 to convert the device RGB signal into a YMCK signal that matches a toner color. In addition, the image processing control unit 100 employs a calibration table included in the conversion table 101 to convert the YMCK signal into a Y'M'C'K' signal obtained by correcting the density-gradation characteristic inherent to each image forming apparatus. Then, the image processing control unit 100 controls the exposing light emitted by the scanners 10Y, 10M, 10C and 10K in accordance with the Y'M'C'K' signal to form on the photosensitive drums 5 electrostatic latent images that correspond to an image to be output.

An image forming control unit 102 controls the individual image forming sections, such as the charging means 7, the developing means 8, the fixing part 13 and the misregistration detecting means 22. The image forming control unit 102 receives an RGB signal, the detection results obtained by the detecting part 26, and outputs the RGB signal to the image processing control unit 100. It should be noted that the RGB signal to be output to the image processing control unit 100 may be the signal detected by the detecting part 26, or an RGB signal obtained by the image forming control unit 102 through a predetermined correction.

In the correction operation performed to correct the chromaticity or the density, a toner patch 41 for controlling the density or the chromaticity is formed on the recording medium 1, and is detected by the detecting part 26 as the RGB signal. The detected RGB signal is output to the image processing control unit 100 and is employed to correct at least one of the color matching table, the color separation table and the calibration table that constitute the conversion table 101. As a result, an image forming apparatus can be provided that performs the above-described correction operation, so that a change in the color balance does not occur due to the efficiency with which the toner image is transferred to the recording medium, or due to the heat and pressure applied during the image fixing.

It should be noted that this correction operation is performed to form a toner patch 41 on a recording medium 1, and that the frequent performance of the correction operation is not desirable because for each operation a recording medium 1 is used and toner is consumed. It is preferable that the correction operation be performed when a new cartridge is first employed following a cartridge replacement, when a user uses the operation panel to input an instruction for the performance of the correction operation, or when a predetermined number of recording media 1 have been output.

As is described above, in this embodiment a color image forming apparatus of a tandem type that includes multiple photosensitive drums has been employed. However, a color image forming apparatus of a one drum type can be employed in the same manner. And when the detecting part 26 is so designed that it can detect the density of a monochromatic toner image fixed to a recording medium 1, a monochrome image forming apparatus can also be employed.

In addition, the roller part 42a, the rolling parts 44a and the ribs 43 have been employed as conveying parts for conveying the recording medium 1 that is contacting them. Further, as for the other members, such as the flappers 27 and 28 in FIG. 2, that contact the recording medium 1, the toner patch 41 should also be formed at positions other than those whereat the members contact the recording medium 1.

Furthermore, in this embodiment the toner patch 41 has been formed at locations on a recording medium whereat the roller part 42a, the rolling parts 44a and the ribs 43, which are arranged along the path along which a recording medium 1 is conveyed as it passes through the image forming part, do not contact the recording medium 1. However, along the conveying path extending between the image forming part and the paper supply port through which the recording medium 1 is fed, the surface of the recording medium 1 tends to become uneven at those locations whereat it contacts the roller parts 42a, the rolling parts 44a and the ribs 43. Therefore, it is preferable that the toner patch 41 be formed at locations whereat the recording medium 1 is not contacted by the conveying parts along the conveying path extending between the image forming part and the paper supply port through which the recording medium 1 is fed.

As is described above, in the first embodiment, since the toner patch 41 is formed on the surface of a recording medium 1 at a location that is not contacted by the roller 42, the rolling members 44 and the ribs 43, unfixed toner that has been charged by the friction produced between the recording medium 1 and a conveying part will not be attracted to the conveying parts, and a toner stain will not appear on the surface of the recording medium 1 where it contacts a conveying part.

Further, since a conveying part does not rub against the surface of the toner patch 41, micro stripes and paper fiber roughness will not occur on the surface of the toner patch 41.

Therefore, in this embodiment, since the occurrence of problems, such as the mixing of colors in the toner patch, a change in the brightness and the entry into the sensor of regularly reflected light, can be prevented, an image forming apparatus can be provided that can form an image having a stable quality.

Moreover, according to the embodiment, since the chromaticity and the density of the toner patch can be correctly detected and the detection results can be fed back for the operating condition and the image processing condition of the image forming unit, an image forming apparatus having satisfactory color reproducibility can be provided.

(Second Embodiment)

In the first embodiment, a toner patch was formed at a location whereat contact with a roller and a rib was avoided. However, there are cases wherein a toner patch cannot be formed at a desired location because of restrictions imposed on the positioning of the detecting part 26, or cases wherein, to increase the conveying efficiency, rollers must be arranged at both edges of a recording medium 1 in the direction perpendicular to that in which the recording medium 1 is conveyed. Therefore, in a second embodiment, a toner patch 41 is formed in consonance with the location of a detecting part 26, and conveying parts, such as a roller part 42a, rolling parts 44a and ribs 43, are arranged so as to avoid the toner patch 41.

Figure 6:
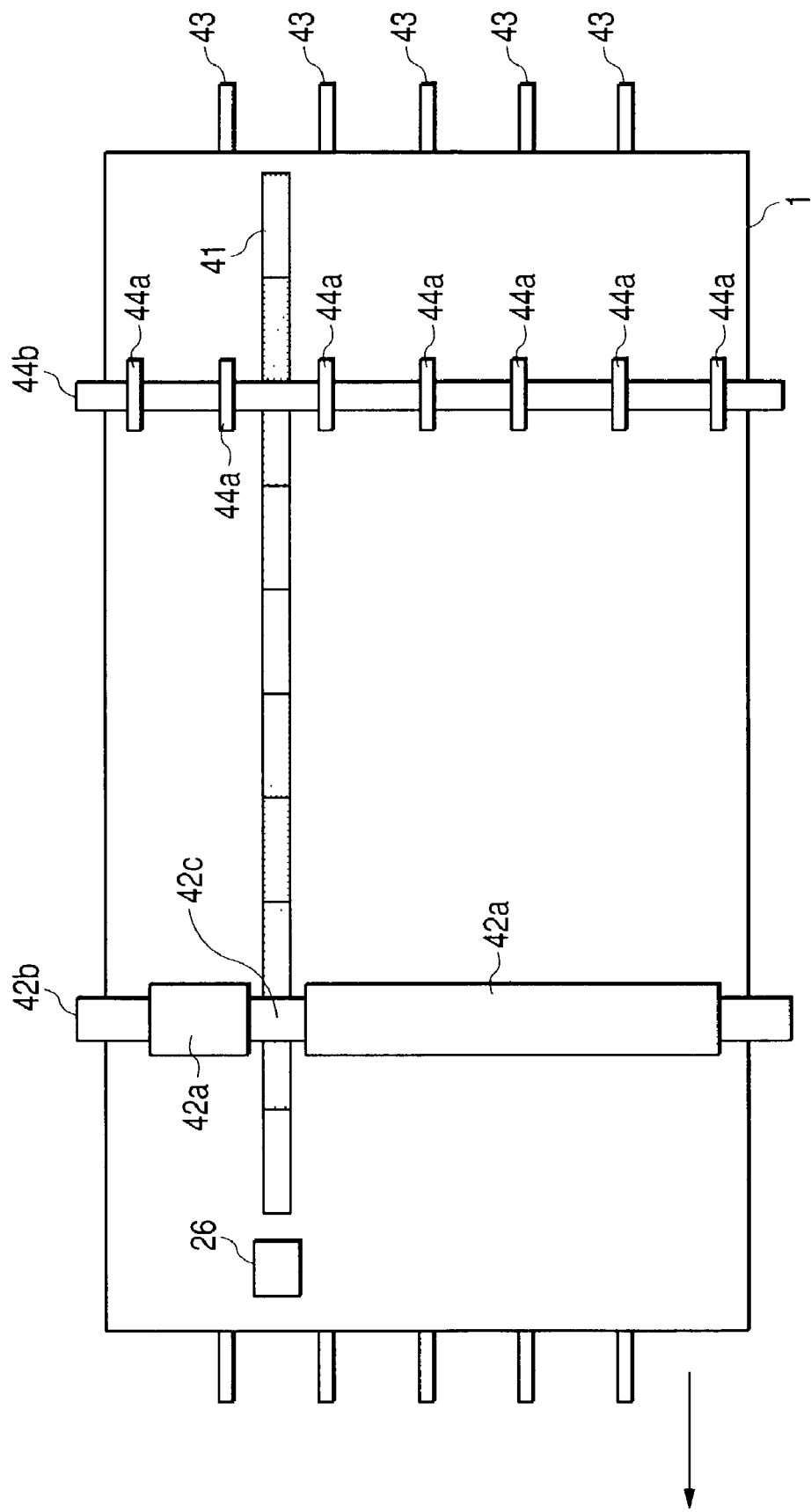
FIG. 6 is a plan view of the positional relationship of a toner patch, a detecting part, a roller, a rib and a rolling member in a color image forming apparatus according to a second embodiment of the present invention.
Figure 7:
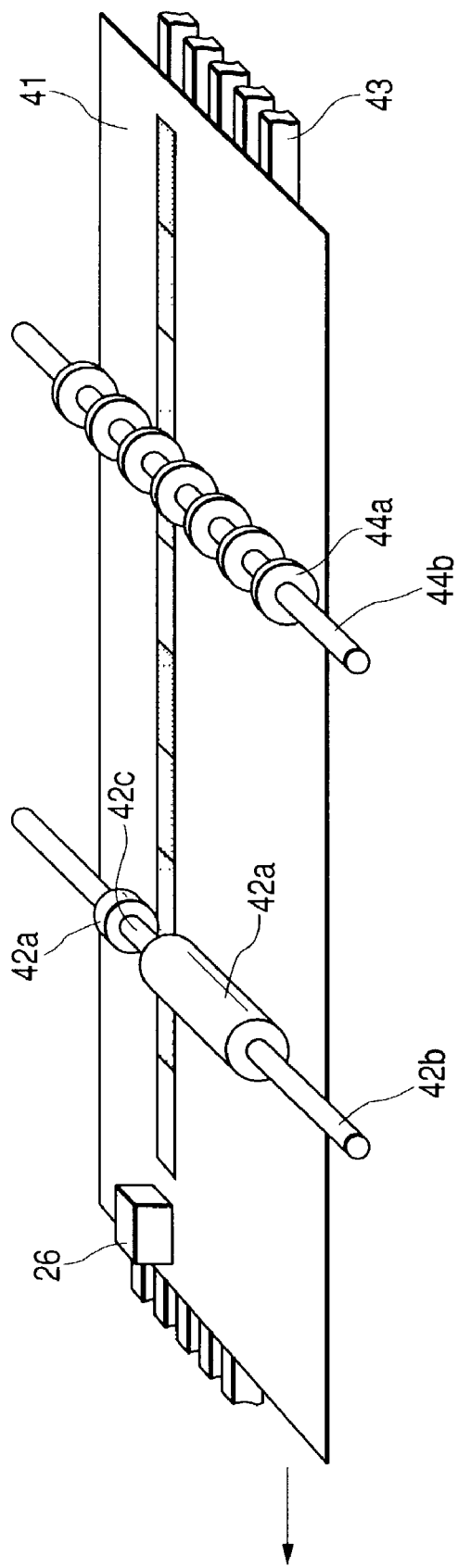
FIG. 7 is a perspective view of the positional relationship of the toner patch, the detecting part, the roller, the rib and the rolling member in the color image forming apparatus according to the second embodiment.
Figure 8:
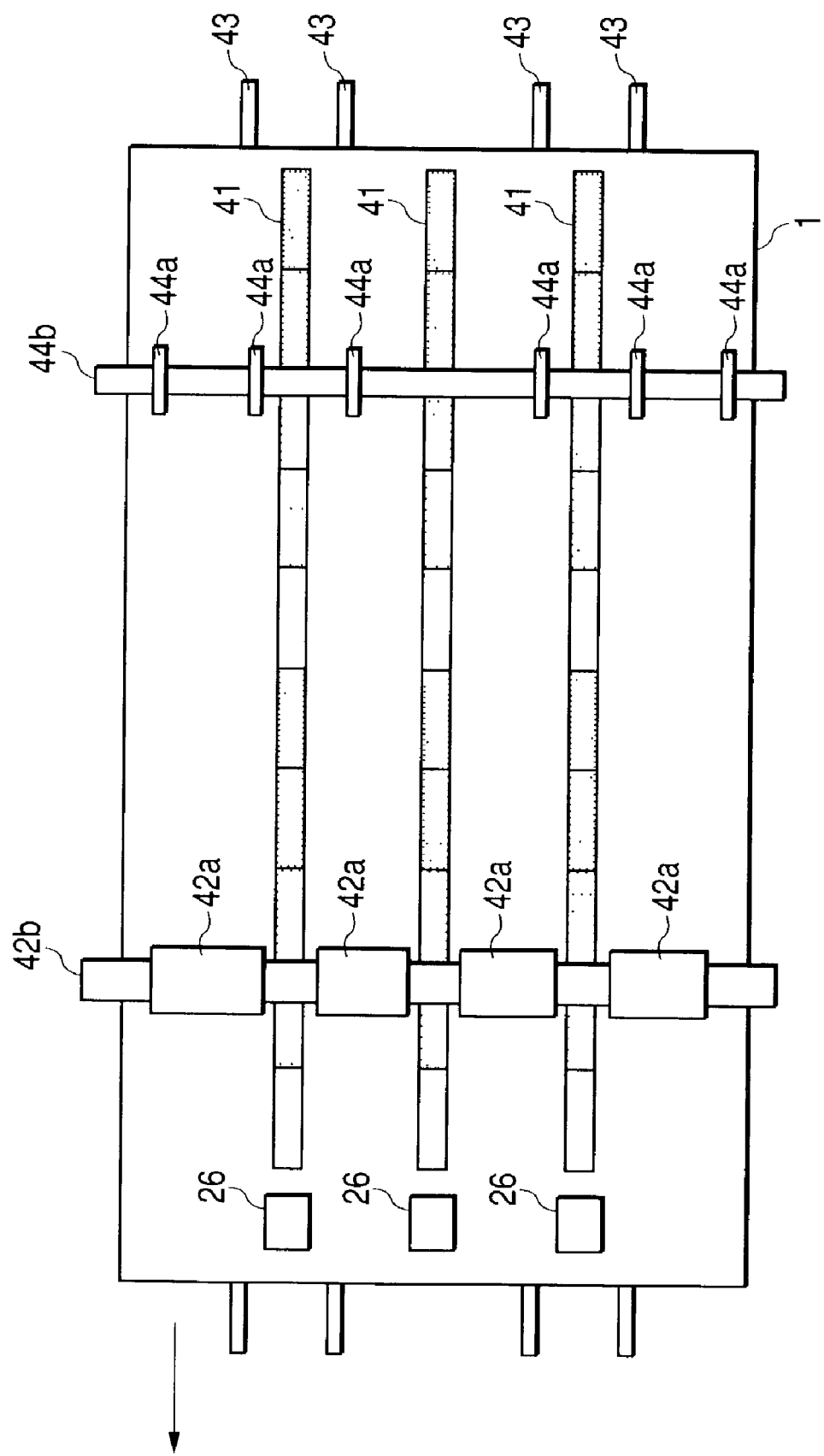
FIG. 8 is a plan view showing another positional relationship of the toner patch, the detecting part, the roller, the rib and the rolling member in the color image forming apparatus according to the second embodiment.
Figure 9:
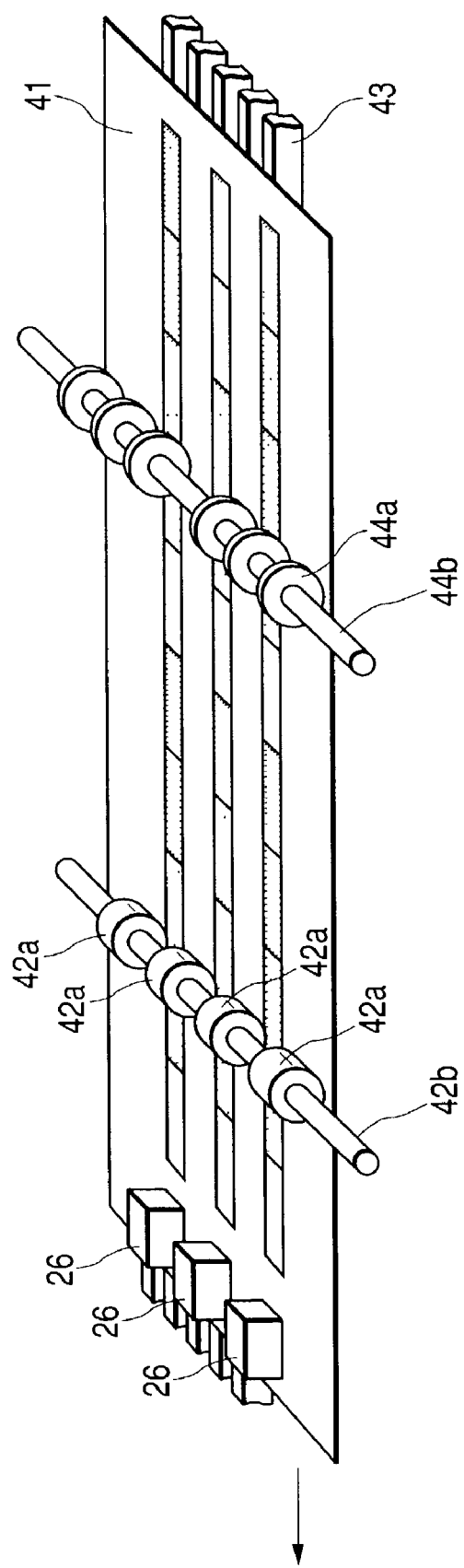
FIG. 9 is a perspective view showing an additional positional relationship of the toner patch, the detecting part, the roller, the rib and the rolling member in the color image forming apparatus according to the second embodiment.

FIGS. 6 and 8 are plan views of the locations of the toner patch 41 and the detecting part 26 and the arrangement of a roller 42, rolling members 44 and ribs 43 for this embodiment, and FIGS. 7 and 9 are perspective views thereof. As is shown in FIG. 6, the toner patch 41 is formed on the recording medium 1 in consonance with the position of the detecting part 26. The roller 42 has a small-diameter portion 42c at a position corresponding to the toner patch 41, so that this portion is narrowed and does not directly touch the toner patch 41.

Since the patch width in the direction perpendicular to the direction in which the toner patch 41 is conveyed is about several mm to ten mm, the length of the small-diameter portion 42c of the roller 42 can be satisfactorily reduced relative to the widths of paper sizes such as A4 and A3 while taking margins into account. In this embodiment, the diameter of the roller 42 is reduced to prevent contact with the toner patch 41. However, the rubber material that is used as the surface material for the roller 42 may be divided to form a gap that in size is equivalent to the width of the toner patch 41. Furthermore, the ribs 43 and the rolling parts 44a are arranged so they avoid the location whereat the toner patch 41 is formed, and the rolling parts 44a are positioned at predetermined intervals in the direction perpendicular to the direction indicated by an arrow in FIG. 6 in which the recording medium 1 is conveyed.

Therefore, according to this embodiment, contact between the conveying parts, such as the roller part 42a, and the toner patch 41 can be avoided, with little noticeable effect on the conveying of the recording medium 1. In this case, the shapes and the locations of the roller 42 and the ribs 43 can be determined in accordance with the availability of a location for the detecting device 26 without needing to avoid the center portion of the recording medium 1, and the toner patch 41 need only be formed at a corresponding location.

FIGS. 8 and 9 are a plan view and a perspective view of an example wherein three of the detecting devices 26 are arranged so they can respectively detect not only the chromaticities and the densities of three toner patches 41 formed on the recording medium 1, but also variances in the chromaticity and the density on the face. The roller parts 42a are so shaped that they do not contact the locations corresponding to the three toner patches 41, and are located at predetermined intervals (e.g., intervals consonant with the width of a toner patch 41) in the direction perpendicular to that in which the recording medium 1 is conveyed. The rolling parts 44a and the ribs 43 are located at positions other than those corresponding to the three toner patches 41. Furthermore, as is shown in FIGS. 8 and 9, the rolling parts 44a may be arranged at predetermined intervals at both ends in the direction perpendicular to that in which the recording medium 1 is conveyed, and may be so arranged that there is a larger interval in the center.

In this embodiment, as in the first embodiment, along the path along which the recording medium 1 is conveyed after passing through the image forming unit, the roller parts 42a, the rolling parts 44a and the ribs 43 are so positioned that they do not contact the toner patches 41 on the recording medium 1, and the detecting parts 26 are positioned at locations consonant with those of the toner patches 41. Regardless of whether the detecting parts 26 are arranged at the separate position b or c, or at another position, the same effects can be obtained since only the path leading from the paper supply port to the detecting parts 26 is changed.

In this embodiment, a color image forming apparatus of a tandem type having multiple photosensitive drums has been employed. However, the same explanation as given here can be applied for a color image forming apparatus of a single drum type. Further, when the detecting parts 26 are employed to detect the density of a monochromatic toner image fixed to a recording medium 1, a monochrome image forming apparatus can also be employed.

In this embodiment, the roller parts 42a, the rolling parts 44a and the ribs 43 have been employed as conveying parts for conveying the recording medium 1 they contact. However, as for other members, such as the flappers 27 and 28 in FIG. 2, that contact the recording medium 1, the toner patches 41 should be formed at locations other than those whereat the recording medium 1 is contacted.

In addition, in this embodiment, the toner patches 41 have been formed at locations whereat the roller parts 42a, the rolling parts 44a and the ribs 43, which are arranged along the conveying path along which a recording medium 1 that has passed through the image forming unit is conveyed, do not contact the recording medium 1. However, also along the conveying path between the image forming unit and the paper supply port for supplying the recording media 1, the surface of a recording medium 1 tends to be become uneven at those locations whereat it contacts conveying parts, including the roller parts 42a, the rolling parts 44a and the ribs 43. Therefore, even along this conveying path it is preferable that the toner patches 41 not be formed at locations that are contacted by the conveying parts.

As is explained above, in this embodiment, the roller 42 located along the conveying path leading from the paper supply port to the detecting part is so shaped that it does not contact the toner patches 41, and the rolling parts 44a and the ribs 43 are also positioned so that contact with the toner patches 41 is avoided. Thus, unfixed toner that is charged due to the friction produced between the recording medium 1 and the roller parts 42a will not be attracted to the conveying parts, and toner stains will not appear on the surface of the recording medium 1 that contacts the conveying parts.

Further, since the conveying parts do not rub against the surface of a toner patch 41, micro stripes and paper fiber roughness will not occur on the surface of the toner patch.

Since in this embodiment barriers, such as the color mixture of the toner patch, the fluctuation of the brightness and the entry of regular reflected light into the sensor, can be prevented, an image forming apparatus can be provided that can form an image having a stable quality.

Further, according to the embodiment, the chromaticity and the density of the toner patch can be accurately detected, and the detection results can be accurately fed back for the operating condition and the image processing condition of the image forming unit. As a result, an image forming apparatus can be implemented that has satisfactory color reproducibility.

(Third Embodiment)

Figure 10:
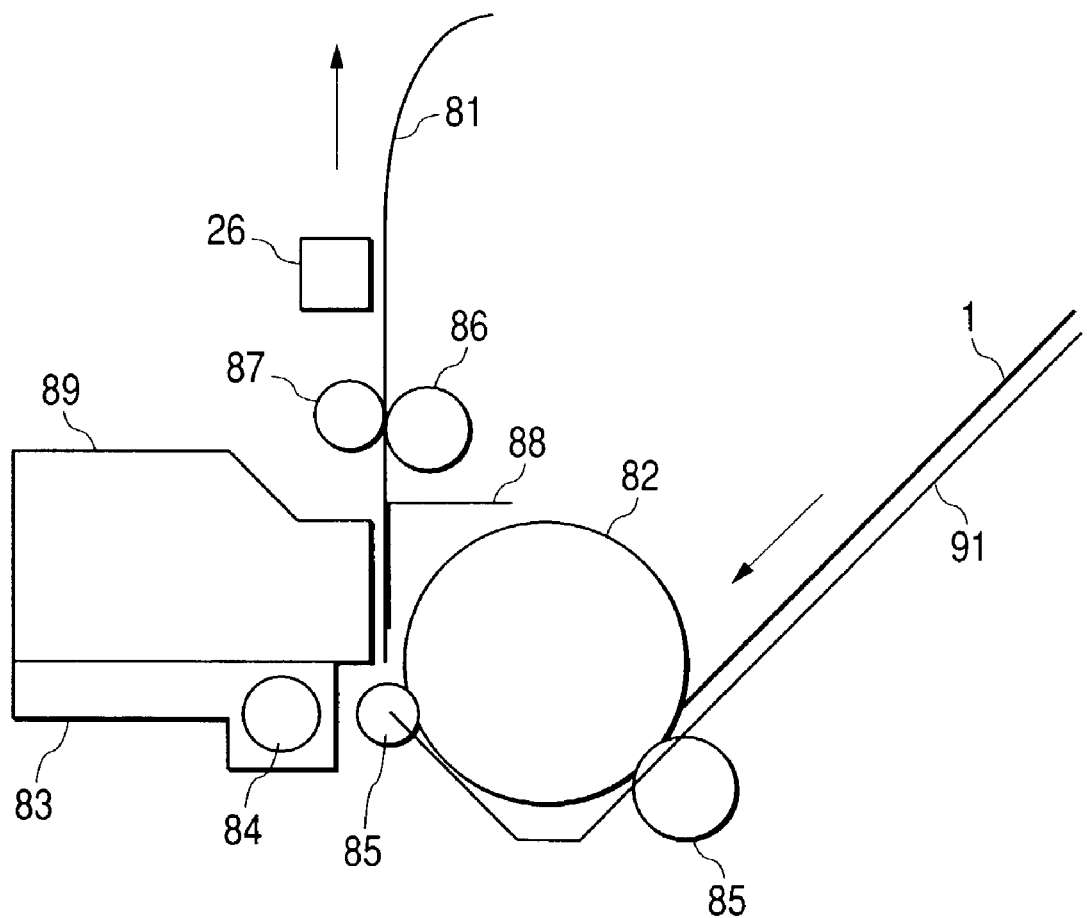
FIG. 10 is a diagram showing the conveying system of a color image forming apparatus according to a third embodiment of the present invention.

FIG. 10 is a cross-sectional view of the conveying system of an ink-jet image forming apparatus according to a third embodiment. A recording medium 1 is wound around a conveying roller 82, and is conveyed between the conveying roller 82 and a feed roller 85. When the recording medium 1 has reached a platen 88, ink is ejected from an opposite head cartridge 89, and an ink patch for detecting chromaticity and density is recorded. The image forming apparatus of this embodiment employs the ink-jet method for forming a color image, based on color image data, on the recording medium 1. Based on the color image data, colored inks are ejected by the ink cartridges 89 that are provided for the individual colors yellow (Y), magenta (M), cyan (C) and black (K), and the color ink image is formed on the recording medium 1.

Further, the thus conveyed recording medium 1 is discharged from the discharge port of the case by a discharge roller 86 and a spur 87. The detecting part 26 in FIGS. 4 and 5 is positioned along the conveying path at a location passed by the recording medium 1 before it is discharged. Under the control of the control unit of the image forming apparatus (not shown), the detecting part 26 detects the chromaticity and density of an ink patch formed on the recording medium 1, and feeds the detection results back to be used for calculating the amount of ink that must be ejected to obtain a desired density or chromaticity.

The head cartridges 89 are mounted on a carriage 83, and perform the main scanning along a guide shaft 84 in the direction perpendicular to that in which the recording medium 1 is conveyed. At this time, between the paper supply port for the recording medium 1 and the detecting part 26, the conveying roller 82, the feed roller 85, the discharge roller 86, the spur 87 and ribs on a guide 91 contact the recording medium 1, but do not contact the ink patch on the recording medium 1. Specifically, as is explained in the first and the second embodiments, the location of the ink patch is selected, or the shapes of the rollers and the locations of the ribs are determined so that the rollers and the ribs avoid the ink patch. Therefore, the ink patch will not be stained with ink attached to the conveying roller 86, or micro stripes and paper fiber roughness will not occur on the surface of the ink patch.

In this explanation, the head cartridges 89 are mounted on the carriage 83, and move in the main scanning direction along the guide shaft 84. A head cartridge that employs a line head that is larger than the width of a recording medium may be moved in the same scanning direction perpendicular to the direction in which the recording medium 1 is conveyed. In this case, the head cartridge is fixed in advance, and ink is ejected in accordance with the image data to form an image on the recording medium 1.

In this embodiment, an explanation has been given for an ink-jet image forming apparatus that forms a color ink image, based on color image data, on a recording medium. When the detecting part 26 can detect the density of a monochromatic toner image that is fixed to a recording medium 1, this embodiment can also be applied for a monochrome image forming apparatus that uses a monochromatic ink to form an image on a recording medium 1.

As is described above, according to the embodiment, since barriers, such as the color mixture of an ink patch, the fluctuation of brightness and the entry into the sensor of regularly reflected light, can be prevented, an image forming apparatus can be provided that can form an image having a stable quality.

Furthermore, since the chromaticity or density of an ink patch can be accurately detected, precise detection results can be fed back for the operating condition or the image processing condition of an image forming apparatus. Thus, an ink-jet image forming apparatus having satisfactory color reproducibility can be provided.

As is described in the first through the third embodiments, according to the present invention, an image forming apparatus can be provided that can form an image having a stable quality.

Further, an image forming apparatus can be provided that can prevent the staining of a toner patch or the occurrence of micro stripes or fiber roughness, and that can accurately detect the chromaticity or density of the toner patch and feed the detection results back for the operating condition or the image processing condition of an image forming unit, so that color reproducibility can be preferably controlled.

The present invention has been explained by using the several preferred embodiments. However, the present invention is not limited to these embodiments, and can be obviously variously modified within the scope of the claims.

What is claimed is:

1. An image forming apparatus comprising:
   image forming means for forming an image on a recording medium;
   conveying means having a conveying part for conveying the recording medium on which the image is formed by said image forming means, while contacting the recording medium;
   detection means for detecting the chromaticity or the density of the image formed on the recording medium by the image forming means; and
   control means for controlling the image forming apparatus based on the chromaticity and the density of the image detected by the detection means,
   wherein said image forming means forms, at a predetermined position on the recording medium that said conveying part of said conveying means does not contact, a detection target image that said detection means detects a chromaticity or a density thereof.

2. An image forming apparatus according to claim 1, wherein said detection means comprises:
   irradiating means for irradiating the detection target image to be detected that is formed on the recording medium; and
   light receiving means for receiving light reflected by the detection target image that is irradiated by said irradiating means.

3. An image forming apparatus according to claim 1, wherein said image forming means comprises:
   electrostatic latent image forming means for forming electrostatic latent images on a photosensitive member based on image data;
   developing means for developing the electrostatic latent images and forming toner images on said photosensitive member;
   transferring means for transferring the toner images to the recording medium; and
   fixing means for fixing the toner images that have been transferred to the recording medium.

4. An image forming apparatus according to claim 3, wherein the image data is color image data; said transferring means transfers, to the recording medium, a color toner image that consists of the toner images based on the color image data for individual colors; and said fixing means fixes the color toner image.

5. An image forming apparatus according to claim 1, wherein said image forming means comprises ink ejecting means for ejecting ink based on the image data to form an ink image on the recording medium.

6. An image forming apparatus according to claim 1, wherein said conveying means comprises, as said conveying part, a roller for conveying the recording medium while in contact therewith, and a roller shaft for applying a conveying force to said roller.

7. An image forming apparatus according to claim 1, wherein said conveying means and said detection means are arranged along a discharge conveying path along which the recording medium, on which an image has been formed by said image forming means, is discharged outside said image forming apparatus.

8. An image forming apparatus according to claim 1, wherein said conveying means and said detection means are arranged along a double-sided conveying path along which the recording medium, on a first face of which an image has been formed by said image forming means, is inverted in order to form an image on a second face of the recording medium.

9. An image forming apparatus according to claim 1, wherein said conveying means is arranged at multiple different positions in the direction in which the recording medium is conveyed; and said image forming means forms the detection target image to be detected at the predetermined position on the recording medium whereat the recording medium does not contact the multiple conveying parts of said conveying means.

10. An image forming apparatus according to claim 1, wherein the predetermined position is near an edge of the recording medium in a direction perpendicular to the direction in which the recording medium is conveyed.

11. An image forming apparatus according to claim 1, wherein said image forming means does not form the detection target image to be detected at positions other than the predetermined position.

12. An image forming apparatus comprising:
  image forming means for forming an image on a recording medium;
  conveying means, having a conveying part for conveying the recording medium on which the image is formed by said image forming means while contacting the recording medium;
  detection means for detecting the chromaticity or the density of the image formed on the recording medium by said image forming means; and
  control means for controlling said image forming apparatus based on the chromaticity or the density of the image detected by said detection means,
  wherein said conveying part of said conveying means is located at a predetermined position, in a direction substantially perpendicular to the direction in which the recording medium is conveyed, whereat said conveying part does not contact a target detection image formed by said image forming means.

13. An image forming apparatus according to claim 12, wherein said detection means comprises:
  irradiating means for irradiating the detection target image to be detected that is formed on the recording medium; and
  light receiving means for receiving light reflected by the detection target image that is irradiated by said irradiating means.

14. An image forming apparatus according to claim 12, wherein said image forming means comprises:
  electrostatic latent image forming means for forming electrostatic latent images on a photosensitive member based on image data;
  developing means for developing the electrostatic latent images and forming toner images on said photosensitive member;
  transferring means for transferring the toner images to the recording medium; and
  fixing means for fixing the toner images that have been transferred to the recording medium.

15. An image forming apparatus according to claim 14, wherein the image data is color image data; said transferring means transfers, to the recording medium, a color toner image that consists of the toner images based on the color image data for individual colors; and said fixing means fixes the color toner image.

16. An image forming apparatus according to claim 12, wherein said image forming means comprises ink ejecting means for ejecting ink based on the image data to form an ink image on the recording medium.

17. An image forming apparatus according to claim 12, wherein said conveying means comprises, as said conveying part, a roller for conveying the recording medium while in contact therewith, and a roller shaft for applying a conveying force to said roller.

18. An image forming apparatus according to claim 12, wherein said conveying means and said detection means are arranged along a discharge conveying path along which the recording medium, on which an image has been formed by said image forming means, is discharged outside said image forming apparatus.

19. An image forming apparatus according to claim 12, wherein said conveying means and said detection means are arranged along a double-sided conveying path along which the recording medium, on a first face of which an image has been formed by said image forming means, is inverted in order to form an image on a second face of the recording medium.

20. An image forming apparatus according to claim 12, wherein said conveying means is arranged at multiple different positions in the direction in which the recording medium is conveyed; and multiple conveying parts of said conveying means are located at predetermined positions, in the direction perpendicular to the direction in which the recording medium is conveyed, whereat said multiple conveying parts do not contact the image to be detected that is formed by said image forming means.

21. An image forming apparatus according to claim 12, further comprising:
  a plurality of said detection means,
  wherein, at said multiple predetermined positions, said plurality of detection means detect the target detection image to be detected that is formed by said image forming means.

* * * * *